(12) United States Patent
Katayama et al.

(10) Patent No.: US 7,937,733 B2
(45) Date of Patent: May 3, 2011

(54) INFORMATION PROCESSING SYSTEM, INFORMATION PROCESSING APPARATUS, INFORMATION PROCESSING METHOD, PROGRAM AND RECORDING MEDIUM

(75) Inventors: Tamao Katayama, Tokyo (JP); Kazunori Suto, Miyagi (JP); Natsuko Nishikata, Kanagawa (JP)

(73) Assignee: Sony Corporation (JP)

( * ) Notice: Subject to any disclaimer, the term of this patent is extended or adjusted under 35 U.S.C. 154(b) by 492 days.

(21) Appl. No.: 11/897,537

(22) Filed: Aug. 30, 2007

(65) Prior Publication Data

US 2008/0216130 A1 Sep. 4, 2008

(30) Foreign Application Priority Data

Sep. 5, 2006 (JP) ................ P2006-240875

(51) Int. Cl.
*H04N 7/18* (2006.01)
*H04N 7/16* (2011.01)
(52) U.S. Cl. .............. 725/80; 725/82; 725/141
(58) Field of Classification Search .......... 725/80, 725/82
See application file for complete search history.

(56) References Cited

U.S. PATENT DOCUMENTS

| | | | |
|---|---|---|---|
| 6,469,633 B1 * | 10/2002 | Wachter | 340/825.69 |
| 6,930,661 B2 | 8/2005 | Uchida et al. | |
| 7,071,865 B2 * | 7/2006 | Shibamiya et al. | 341/176 |
| 7,581,182 B1 * | 8/2009 | Herz | 715/713 |
| 2003/0233652 A1 | 12/2003 | Hsieh | |
| 2005/0184968 A1 * | 8/2005 | Uchida et al. | 345/173 |
| 2006/0085835 A1 * | 4/2006 | Istvan et al. | 725/119 |
| 2006/0236349 A1 * | 10/2006 | Lee | 725/80 |
| 2007/0079340 A1 * | 4/2007 | McEnroe | 725/78 |
| 2008/0178216 A1 * | 7/2008 | Bennington et al. | 725/39 |

FOREIGN PATENT DOCUMENTS

| | | |
|---|---|---|
| EP | 1175087 A2 | 1/2002 |
| JP | 10-116058 A | 5/1998 |
| JP | 2001-025075 A | 1/2001 |
| JP | 2002-034023 A | 1/2002 |
| WO | 2005/074268 A1 | 8/2005 |

OTHER PUBLICATIONS

European Search Report, EP 07115742, dated Dec. 30, 2009.

* cited by examiner

*Primary Examiner* — John W Miller
*Assistant Examiner* — Chris Parry
(74) *Attorney, Agent, or Firm* — Lerner, David, Littenberg, Krumholz & Mentlik, LLP

(57) ABSTRACT

An information processing system may include first apparatus and second apparatus coupled to each other through communications means. The first apparatus may include a transmitting/receiving unit effecting two-way communications with the second apparatus, and a control unit that transmits data corresponding to the operating signal from the transmitting/receiving unit to the second apparatus in response to an operating signal transmitted from the second apparatus, and to perform control of the first apparatus. The second apparatus may include a transmitting/receiving unit effecting two-way communications with the first apparatus, a display displaying an image based on the data transmitted from the first apparatus, and a control unit that displays, on a screen of the display, a first operating image for operating the first apparatus and a second operating image for operating a menu screen related to the first apparatus, in response to a remote controller signal supplied from a remote controller.

6 Claims, 15 Drawing Sheets

INFORMATION PROCESSING SYSTEM, INFORMATION PROCESSING APPARATUS, INFORMATION PROCESSING METHOD, PROGRAM AND RECORDING MEDIUM

CROSS-REFERENCE TO RELATED APPLICATIONS

This application claims priority from Japanese Patent Application No. JP 2006-240875 filed in the Japanese Patent Office on Sep. 5, 2006, the entire content of which is incorporated herein by reference.

BACKGROUND OF THE INVENTION

1. Field of the Invention

The present invention relates to an information processing system, an information processing apparatus, an information processing method, a program and a recording medium, which are adapted to effect two-way communications between a first information processing apparatus to which an external device is connected and a second information processing apparatus having a display apparatus, for instance. More specifically, the present invention relates to an information processing system, an information processing apparatus, an information processing method, a program and a recording medium, which enable a control panel displayed on a display of a display apparatus in relation to a first information processing apparatus and an external device to be controlled with a remote controller attached to a second information processing apparatus.

2. Description of the Related Art

In recent years, remote control systems are widely used, which realized that an image on a Digital Versatile Disk (DVD) or a Hard Disk Drive (HDD) connected to a base apparatus and/or an image of a TV tuner contained in the base apparatus may be watched on a display apparatus, such as a mobile terminal equipment or a personal computer, and the like via the Internet and/or a LAN.

The remote control systems of this type are adapted to effect remote control of an external apparatus from a display apparatus side by, upon receipt of an operating signal sent from the display apparatus to the base apparatus, converting the received operating signal into an infrared control signal and emitting the infrared control signal to the external apparatus.

As remote control methods, there is disclosed, for instance, a method of effecting remote control of a remote external apparatus from a display apparatus side by displaying, on a display of the display apparatus, a control panel for a user to make operational input, while with a touch panel mounted on a display surface, directly touching a touch panel portion corresponding to a predetermined position of the control panel (See Japanese Patent Application Publication No. JP 2002-34023, hereinafter referred as Patent Document 1).

However, types of the display apparatus are not limited to dedicated monitors having touch panel functions, but various types may be available. Thus, for a display apparatus such as those not having such touch panel functions, the control panel displayed on the display of the display apparatus is operated by an attached remote controller.

FIG. 15 shows a screen on which a control panel 200 is displayed. A menu screen of an external device to be remote-controlled, for instance, is displayed on the screen of a display apparatus 300. The control panel 200 is displayed on the right side of the screen of the display apparatus 300 by using an attached remote controller 400, a cursor of the control panel 200 on screen is moved or selected toward a predetermined item by a direction button 410 of the attached remote controller 400, and then a user presses an enter button 420 of the attached remote controller 400. The item selected by movement of a cursor may be recognized by a change of a display color of a selected item button, for instance. If a play button 210 of the control panel 200 is selected and pressed in this manner, for instance, an operating signal is transmitted to the base apparatus to be converted into a control signal, and the converted control signal is then supplied to the external device. In the external device, processing is performed based on the control signal data such as AV data corresponding to the operating signal is transmitted to the display apparatus 300 with the base apparatus in between. Thus, the remote control of the external device from the display apparatus 300 is performed.

SUMMARY OF THE INVENTION

When operating the control panel 200 on the display of the display apparatus 300 as described, an operation of buttons such as the play button 210 and a stop button 220 is performed by moving the cursor to these button items by the direction button 410 of the attached remote controller 400, and pressing the enter button 420. Thus, the attached remote controller 400 has no buttons corresponding to the direction button 230 or the enter button 240 of the control panel 200 in advance, these operations may be performed smoothly by a user.

However, when adapting the control panel 200 to operate a menu screen (such as a program table and a title list) displayed on the screen of the display apparatus 300, for instance, an attempt to move the cursor to a predetermined program item on the menu screen is made by moving or selectively positioning the cursor to the direction button 230 of the control panel 200 by the direction button 410 of the attached remote controller 400, and by pressing the enter button 420 of the remote controller. This allows the cursor on the menu screen of the display apparatus 300 to be moved in a direction selected by the direction button 230 of the control panel 200. For moving the cursor on the menu screen of the display apparatus 300 as described the, it is necessary to select the enter button 420 after the cursor of the control panel 200 is moved to the direction button 230 indicating a desired direction of cursor movement. Thus, although the attached remote controller 400 has the direction button 410 and the enter button 420, there is a need to make selection of the menu item on the menu screen by the direction button 230 and the enter button 420 of the control panel 200 as described. Therefore, the non-intuitive operations cause confusions to users.

Accordingly, it is desirable to provide an information processing system, an information processing apparatus, information processing method, a program and a recording medium, which are all adapted to enable a cursor on a menu screen to operate intuitively, whereby to improve operability. The present invention is made in view of the above-described issues.

According to an embodiment of the present invention, there is provided an information processing system in which first information processing apparatus and a second information processing apparatus may be coupled via communications means. The first information processing apparatus may include a transmitting/receiving unit for effecting two-way communications with the second information processing apparatus, and a control unit adapted to transmit, data corresponding to the operating signal from the transmitting/receiving unit to the second information processing apparatus in response to an operating signal transmitted from the second information processing apparatus, while performing control of the first information processing apparatus. The second information processing apparatus may include a transmitting/receiving unit for effecting two-way communications with the first information processing apparatus, a display apparatus for displaying an image based on the data transmitted from the first information processing apparatus, and a control unit adapted to display, on a screen of the display apparatus, a first operating image for operating the first information processing apparatus and a second operating image for operating a menu screen relating to the first information processing apparatus, in response to a remote controller signal supplied from a remote controller. The control unit of the second information processing apparatus may transmit, an operating signal compatible with the operating item from the transmitting/receiving unit to the first information processing apparatus, when with respect to the first operating image, an enter key on the remote controller is operated after a predetermined operating item on the first operating image is selected and a direction key on the remote controller is operated. The control unit may transmit an operating signal in response to the operated key from the transmitting/receiving unit to the first information processing apparatus, when with respect to the second operating image, the direction key or the enter key of the remote controller corresponding to a predetermined direction-indicating direction key or an enter key on the second operating image is operated.

An information processing apparatus according to an embodiment of the present information may relate to an information processing apparatus coupled to an arbitrary information processing apparatus through communications means, and may include a transmitting/receiving unit for effecting two-way communications with the other information processing apparatus, an image processing unit adapted to allow a display apparatus to display an image based on data transmitted from the other information processing apparatus, and a control unit adapted to display, on a display of the display apparatus by the image processing unit, a first operating image for operating the other information processing apparatus and a second operating image for operating a menu-screen relating to the other information processing apparatus displayed on the display apparatus in response to a remote controller signal supplied from a remote controller. The control unit may transmit, an operating signal compatible with the selected item from the transmitting/receiving unit to the other information processing apparatus, when with respect to the first operating image, an enter key on the remote controller is operated after a predetermined item on the first operating image is selected and a direction key on the remote controller is operated. The control unit may transmit, an operating signal in response to the operated key from the transmitting/receiving unit to the other information processing apparatus, when with respect to the second operating image, the direction key or the enter key of the remote controller corresponding to a predetermined direction-indicating direction key or an enter key on the second operating image is operated.

An information processing method according to an embodiment of the present invention may include a transmitting/receiving step of effecting two-way communications with the other information processing apparatus, an image processing step of allowing a display apparatus to display an image based on data transmitted from the other information processing apparatus, and a control step of displaying, on a screen of the display apparatus through the image processing unit, a first operating image for operating the other information processing apparatus and a second operating image for operating a menu screen relating to the other information processing apparatus displayed on the display apparatus, based on a remote controller signal supplied from a remote controller. The control step may be adapted to transmit an operating signal compatible with the selected item from the transmitting/receiving unit to the other information processing apparatus, when with respect to the first operating image, an enter key on the remote controller is operated after a predetermined item on the first operating image is selected, and a direction key on the remote controller is operated. The control step may be adapted to transmit an operating signal compatible with the operated key from the transmitting/receiving unit to the other information processing apparatus, when with respect to the second operating image, the direction key or the enter key of the remote controller corresponding to a predetermined direction-indicating direction key or an enter key on the second operating image.

It is noted that a correspondence relation of a program recorded in a recording medium according to the present invention and claim elements of a program according to the present invention, and specific instances with respect to the preferred embodiments of the present invention may be the same as that; involved in the information processing according to an embodiment of the present invention, and therefore a description is omitted.

An embodiment of the present invention may aim at displaying the second operating image, which may be different from the first operating image for moving or positioning the cursor on the first information processing apparatus-related menu screen on the display of the display apparatus coupled to the second information processing apparatus. The second operating image may include the direction key and the enter key. When the direction key or the enter key of the remote controller corresponding to the direction key or the enter key included in the second operating image is operated, the operating signal of the key in response to the operation may be transmitted to the first information processing apparatus. The operating signal may be converted into an infrared type control signal, for instance, and then emitted to the external device which is coupled to the first information processing apparatus. In other words, in conjunction with the operation of the direction key of the remote controller or the like, the control signal may emit light. This may allow the cursor on menu screen displayed on the display apparatus of the information processing apparatus to be operated in conjunction with the operation of the direction key of the remote controller, or the like.

DETAILED DESCRIPTION

An embodiment of the present invention is now described with reference to the accompanying drawings.

Figure 1:
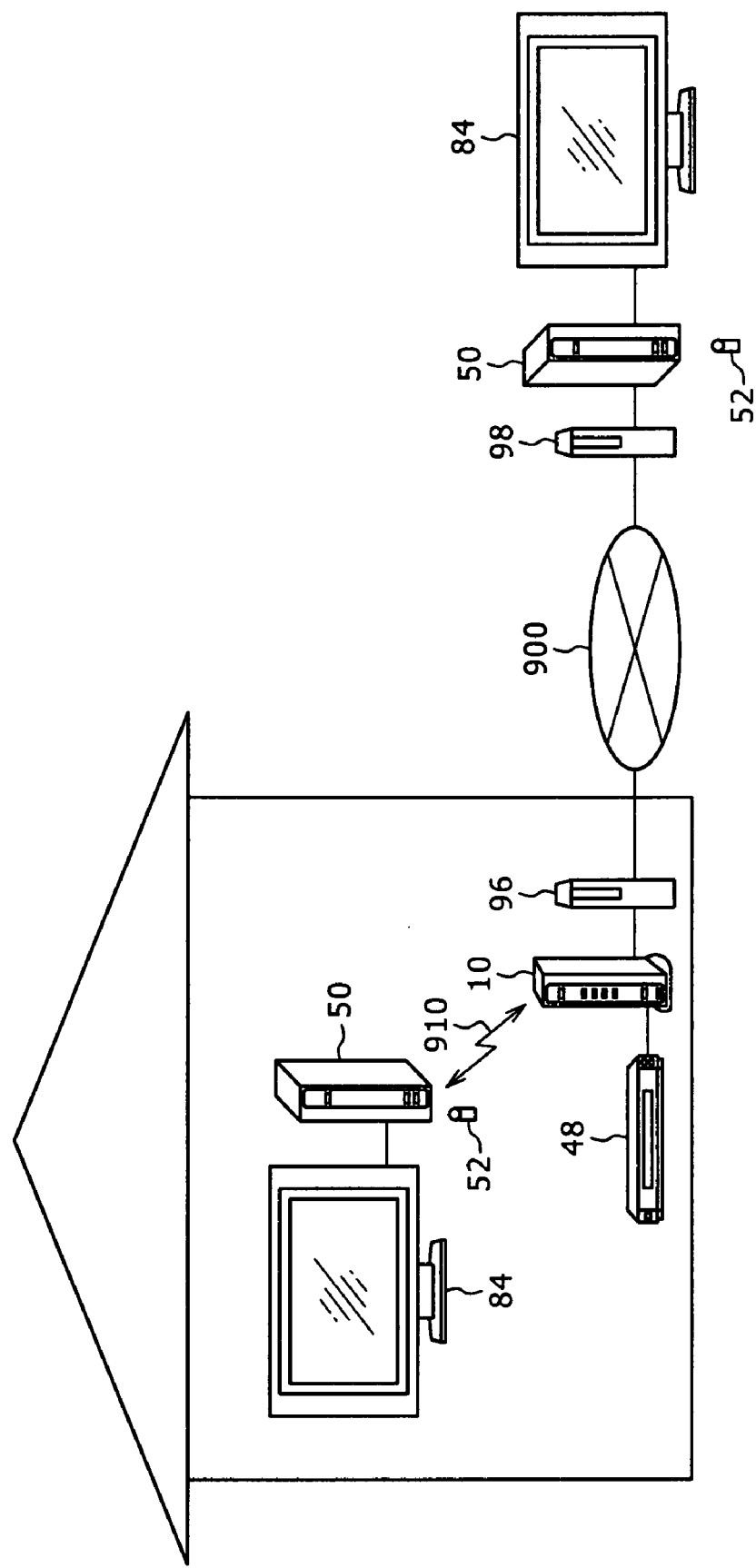
FIG. 1 is a view showing a configuration of an information processing system according to one embodiment of the present invention.

An information processing apparatus according to one embodiment of the present invention is described first. FIG. 1 is a view showing an overall configuration of the information processing system.

As shown in FIG. 1, the information processing system has a base station 10 included in one instance of a first information processing apparatus and a TV box 50 included in one instance of a second information processing apparatus. The base station 10 and the TV box 50 are respectively connected or coupled to an Internet 900 with routers 96, 98 in between, to allow two-way communications with each other. Further, a wireless LAN 910 allows connection or coupling between the base station 10 and the TV box 50.

The base station 10 controls, in response to an operating signal transmitted from the TV box 50, operations of an external device 48 connected to the base station 10 and a tuner contained in the base station 10, and the like. The external device 48 is connected to an external input terminal of the base station 10 and includes those such as VTR, STB, IRD and Digital Video Disks (DVD), for instance.

The TV box 50 transmits, to the base station 10, the operating signal for effecting remote control of the external device 48 connected to the base station 10 and/or the tuner contained in the base station 10. Further, a liquid crystal display apparatus 84 included in one instance of a display apparatus is connected to the TV box 50, such that TV and DVD images transmitted from the base station 10 and/or an operating screen for operating the base station 10 or the external device 48 connected to the base station are displayed. As the display apparatus connected to the TV box 50, in addition to the liquid crystal display apparatus 84, Cathode Ray Tube (CRT) display apparatuses or plasma display apparatuses, and the like that are typically on the market for TV viewing may be employed.

Figure 2:
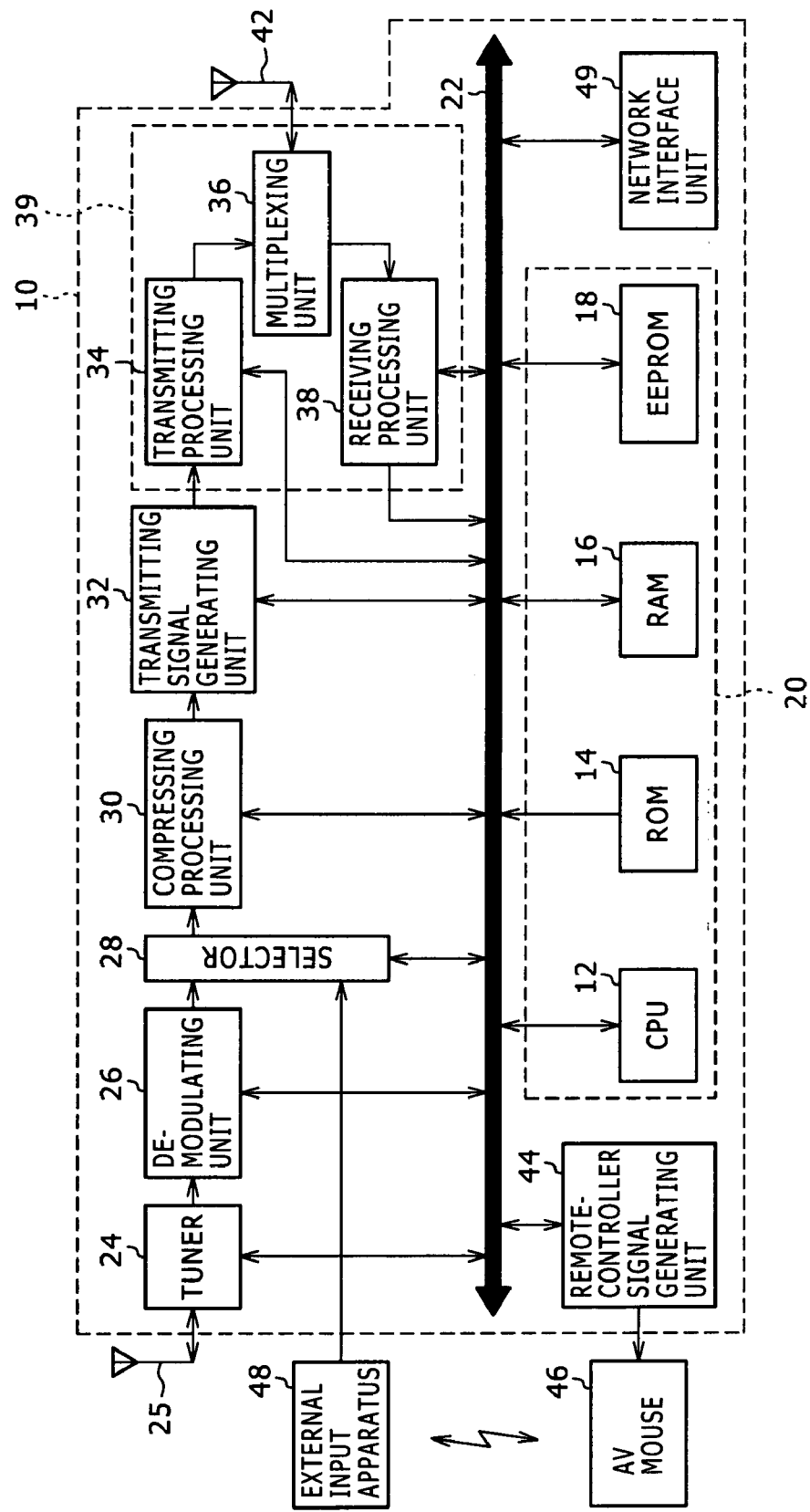
FIG. 2 is a block diagram showing a base station.

Next, a block configuration of the base station 10 is described. FIG. 2 is a block diagram showing one configuration of the base station 10.

As shown in FIG. 2, the base station 10 has a control unit 20. The control unit 20 includes a Central Processing Unit (CPU) 12, a Read Only Memory (ROM) 14, a Random Access Memory (RAM) 16, and an Electrically Erasable Programmable Read Only Memory (EEPROM) 18, which are respectively connected to a bus 22.

The CPU 12 is a device to control an overall operation of the base station 10, and acquires data such as AV data from the external device 48, or selects channel of a tuner 24 in response to signals such as the operating signal transmitted from the TV box 50.

Various kinds of processing programs and/or data and the like required for processing are stored in the ROM 14. The RAM 16 temporarily stores and holds data resulting from various processing, and is mainly used as a working area for the various processing. The EEPROM 18 is so-called non-volatile memories, and holds stored information even after power is turned off.

Further, the base station 10 also has an antenna 42 for receiving the signals such as the operating signal transmitted from the TV box 50, and is connected to an antenna 25 for receiving broadcast signals. Upon receipt of the operating signal transmitted from the TV box 50, the antenna 42 supplies the received operating signal to a receiving processing unit 38 with a multiplexing unit 36 in between. The multiplexing unit 36 functions to prevent interference between the received operating signal and an AV data signal to be transmitted. The receiving processing unit 38 is subjected to demodulating and amplifying processing to be supplied to the CPU 12.

When the supplied operating signal is a switching signal for switching either the tuner 24 or the external device 48, the CPU 12 supplies this switching signal to a selector 28. Further, if a judgment by the CPU 12 is that the operating signal corresponds to the external device 48, the CPU 12 supplies the operating signal to a remote control signal generating unit 44. On the other hand, if the judgment by the CPU 12 is that the operating signal corresponds to the tuner 24, the CPU 12 supplies the operating signal to the tuner 24.

The remote control signal generating unit 44 generates an infrared type control signal corresponding to the supplied operating signal of the external device 48. When the external device 48 is DVDs, for example, a control signal includes those related to operations such as play, stop, fast forward, fast rewind, and on-menu screen cursor movement. The generated control signal is supplied to an AV mouse 46.

The AV mouse 46 converts the supplied control signal into an infrared signal, and emits the infrared control signal to the external device 48. The AV mouse of this type is placed in the vicinity of the external device 48 such that the external device 48 may receive the signal emitted from the AV mouse 46.

The external device 48 receives the emitted control signal at a light receiving unit for a remote controller, then performs processing based on the control signal. Specifically, the external device 48 is remote-controlled based on the signal supplied from the TV box 50-side. Further, the external device 48 is connected to an input terminal of the base station 10 to supply, to the selector 28 of the base station 10, an AV data signal such as audio signals and image signals in response to a request of the control signal supplied from the TV box 50.

The tuner 24 is connected to the antenna 25 for receiving the television broadcasting signals, such as analog or digital signals to select a television broadcasting signal specified by a user from among the television broadcasting signals to be received in response to the operating signal transmitted from the TV box 50. The selected television broadcasting signal is supplied to a demodulating unit 26. The demodulating unit 26 demodulates the supplied television broadcasting signal to generate an AV data signal consisting of audio data and image data. The generated AV data signal is supplied to the selector 28.

The selector 28 selects either the signal of the external device 48 or the signal of the tuner 24 in response to the switching signal supplied from the CPU 12. The selected AV data signal of the external device 48 or of the tuner 24 is outputted to a compressing processing unit 30.

The compressing processing unit 30 compresses the AV data signal outputted from the selector 28 with compression methods, such as Moving Picture Experts Group (MPEG) 2 or MPEG4. The compressed AV data signal is supplied to a transmitting signal generating unit 32.

The transmitting signal generating unit 32 generates an AV data transmitting signal conforming to, for example, protocol of a type of IEEE (Institute Electrical and Electronics Engineers) 802.11a, 11b, and 11g standard. The AV data transmitting signal generated is in the form of a signal divided into predetermined packet units with header information appended. The generated AV data transmitting signal is supplied to a transmitting processing unit 34.

The transmitting processing unit 34 subject the supplied AV data transmitting signal to modulating and amplifying processing to supply it to the multiplexing unit 36. The multiplexing unit 36 prevents the interference between the AV data transmitting signal and the operating signal to be received, and wirelessly transmits the AV data transmitting signal to the TV box 50 via the antenna 42 over the wireless LAN 910. It is noted that the receiving processing unit 38, the transmitting processing unit 34 and the multiplexing unit 36 are included in a transmitting/receiving unit 39.

A network interface unit 49 for making connection to the Internet 900 is also connected to the bus 22.

Figure 3:
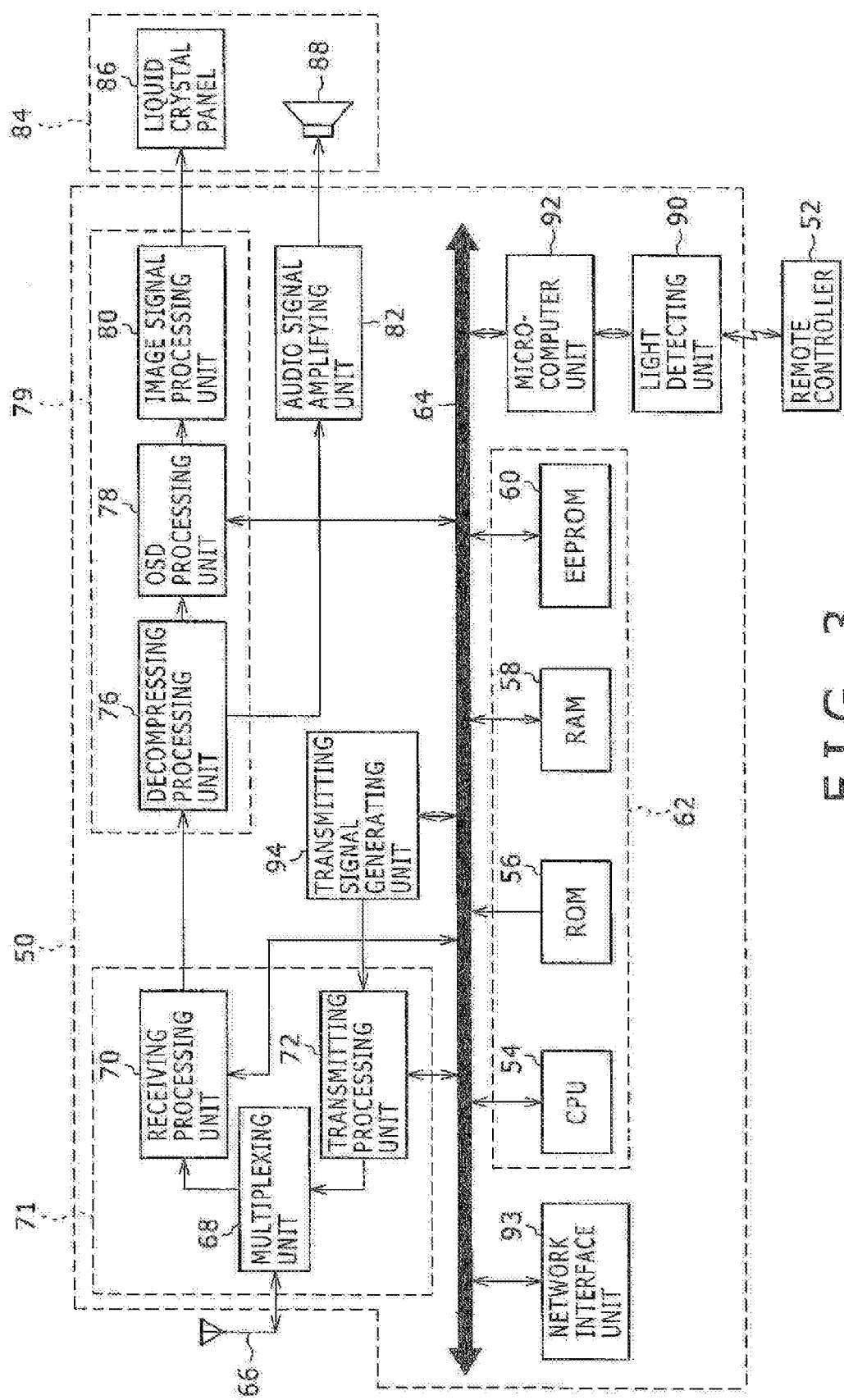
FIG. 3 is a block diagram showing a TV box.

A block configuration of the TV box 50 is now described. FIG. 3 is a block diagram showing one configuration of the TV box 50.

As shown in FIG. 3, the TV box 50 has a control unit 62. The control unit 62 includes a Central Processing Unit (CPU) 54, a Read Only Memory (ROM) 56, a Random Access Memory (RAM) 58, and an Electrically Erasable Programmable Read Only Memory (EEPROM) 60, which are respectively connected to a bus 64.

The CPU 54 is a device to control an overall operation of the TV box 50. Various processing; programs and/or data and the like required for the processing are stored in the ROM 56. The RAM 58 temporarily stores and holds data obtained by various processing, and is mainly used as a working area for the various processing. The EEPROM 60 is so-called nonvolatile memories, and holds stored information even if power is turned off.

The TV box 50 also has an attached remote controller 52, which is adapted to effect an operation of an operating screen displayed on a screen of the liquid crystal display apparatus 84. A configuration of the attached remote controller 52 is described later. Pressing of a predetermined button of the attached remote controller 52 causes an infrared type remote controller signal to be emitted from a light emitting unit to a light receiving unit 90 of the TV box 50. The light receiving unit 90 detects the remote controller signal emitted from the attached remote controller 52, and supplies the detected remote controller signal to a microcomputer unit 92.

The microcomputer unit 92 decodes the supplied remote controller signal, and when the decoded remote controller signal is a signal adapted to display a remote control panel 110 (see FIG. 7) included in a first operating image or a cursor remote control key 120 (see FIG. 9) included in a second operating image, supplies the remote controller signal to an OSD processing unit 78 described later.

The transmitting signal generating unit 94 generates an operating signal for remote-controlling the apparatus such as the external device 48 connected to the base station 10 in response to the remote controller signal supplied from the microcomputer unit 92. The generated operating signal is supplied to a transmitting processing unit 72.

The transmitting processing unit 72 gives demodulating and amplifying processing to the supplied operating signal, followed by transmitting the processed operating signal to the base station 10 via the antenna 66 over the wireless LAN 910.

Upon receipt of the AV data transmitting signal transmitted from the base station 10, the antenna 66 supplies the received AV data transmitting signal to a receiving processing unit 70 with a multiplexing unit 68 in between. The multiplexing unit 68 is to function to prevent interference between the received AV data transmitting signal and the operating signal to be transmitted. The receiving processing unit 70 gives demodulating and amplifying processing to information attached such as a title list received together with the AV data transmitting signal, followed by supplying the processed information to the CPU 54.

Further, upon receipt of the AV data transmitting signal transmitted from the base station 10, the antenna 66 supplies the received AV data transmitting signal to the receiving processing unit 70 with the multiplexing unit 68 in between. This AV data transmitting signal includes those such as image or audio signals of the television broadcasting program selected by the tuner 24 of the base station 10 or image data or audio data and the like selected from the external device 48.

The receiving processing unit 70 gives demodulating and amplifying processing to the supplied AV data signal, followed by supplying the processed AV data signal to a decompressing processing unit 76. It is noted that the receiving processing unit 70, the transmitting processing unit 72 and the multiplexing unit 68 are included in a transmitting/receiving unit 71.

The decompressing processing unit 76 separates the supplied AV data signal into the image signal and the audio signal, followed by decompressing the respective separated signals to obtain image and audio signals which are restored to a state before data compression. Further, the decompressing processing unit 76 also gives digital-to-analog conversion (D/A conversion) to the restored audio signal to generate an analog audio signal. The generated image signal is supplied to, the OSD processing unit 78, and the analog audio signal is supplied to an audio signal amplifying unit 82. It is noted that the image signal gives the D/A conversion in accordance with the type of apparatus connected to an input side or an output side.

The OSD processing unit 78 functions as a so-called text/graphics processing circuit for displaying the remote control panel 110 or the cursor remote control key 120, in addition to the image transmitted from the base station 10, on the display of the liquid crystal panel 86. When the remote controller signal adapted to display the remote control panel 110 or the cursor remote control key 120 is supplied from the attached remote controller 52 with the light receiving unit 90 and the microcomputer unit 92 in between, a signal resulting from synthesizing the image of the AV data signal and the remote control panel 110 is outputted to the liquid crystal panel 86.

The image signal processing unit 80 generates an image signal for display purpose from the supplied image signal, followed by outputting the generated image signal to the liquid crystal panel 86 of the liquid crystal display apparatus 84. Likewise, the audio signal amplifying unit 82 gives amplifying processing to the supplied audio signal, followed by outputting the processed audio signal to a speaker 88 of the liquid crystal display apparatus 84. It is noted that the decompressing processing unit 76, the OSD processing unit 78 and the image signal processing unit 80 are included in an image processing unit 79.

In the liquid crystal display apparatus 84, a display operation based on the image signal is performed to display, on the screen of the liquid crystal panel 86, the DVD image supplied from the external device 48 or the selected television image.

A network interface unit 93 for making connection to the Internet 900 is also connected to the bus 64.

Figure 4:
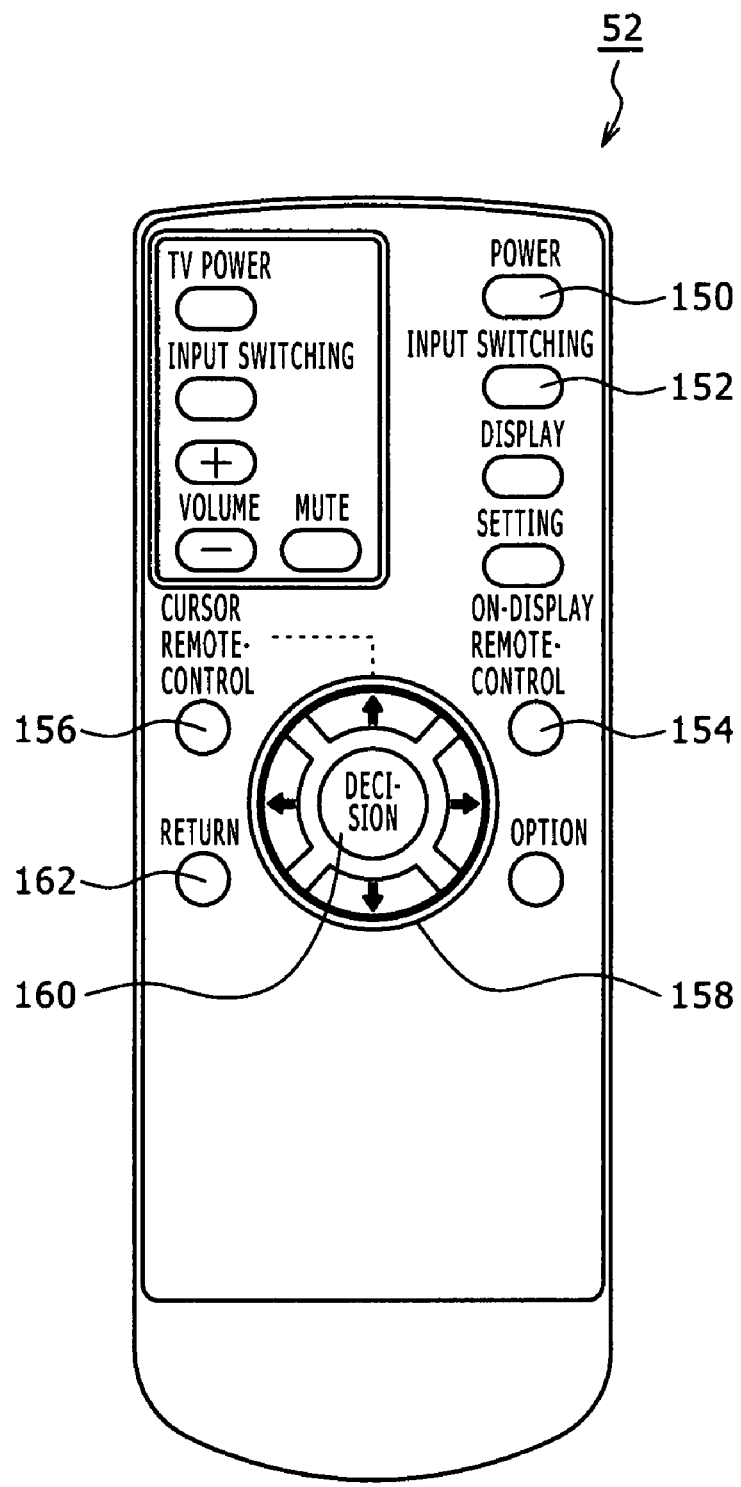
FIG. 4 is a view showing an external configuration of an attached remote controller of the TV box.

Configurations of buttons included in the attached remote controller 52 for operating the TV box 50 are now described. FIG. 4 shows one configuration example of the attached remote controller 52.

As shown in FIG. 4, the attached remote controller 52 has a power button 150 for turning on or off the power of the TV box 50, and an input switching button 152 for switching input of the base station 10. Further, the attached remote controller 52 also has a remote control panel button 154 adapted to display, on the screen, the remote control panel for effecting operations such as those of the external device 48 connected to the base station 10 or selection of the tuner 24 contained in the external device, a cursor remote control button (or a second operating display switching button) 156 adapted to display, on the liquid crystal display apparatus 84, the cursor remote control key for operating the menu screen displayed by the external device 48 connected to the base station 10, a direction button 158 for operating a set-up screen displayed on the screen, as well as the remote control panel 110 and the cursor remote control key 120, and an enter button 160 for entering an item selected by the direction button 158. The attached remote controller 52 further includes a displaying button, a setting button, an option button, a return button 162 and a television operating button.

Figure 5:
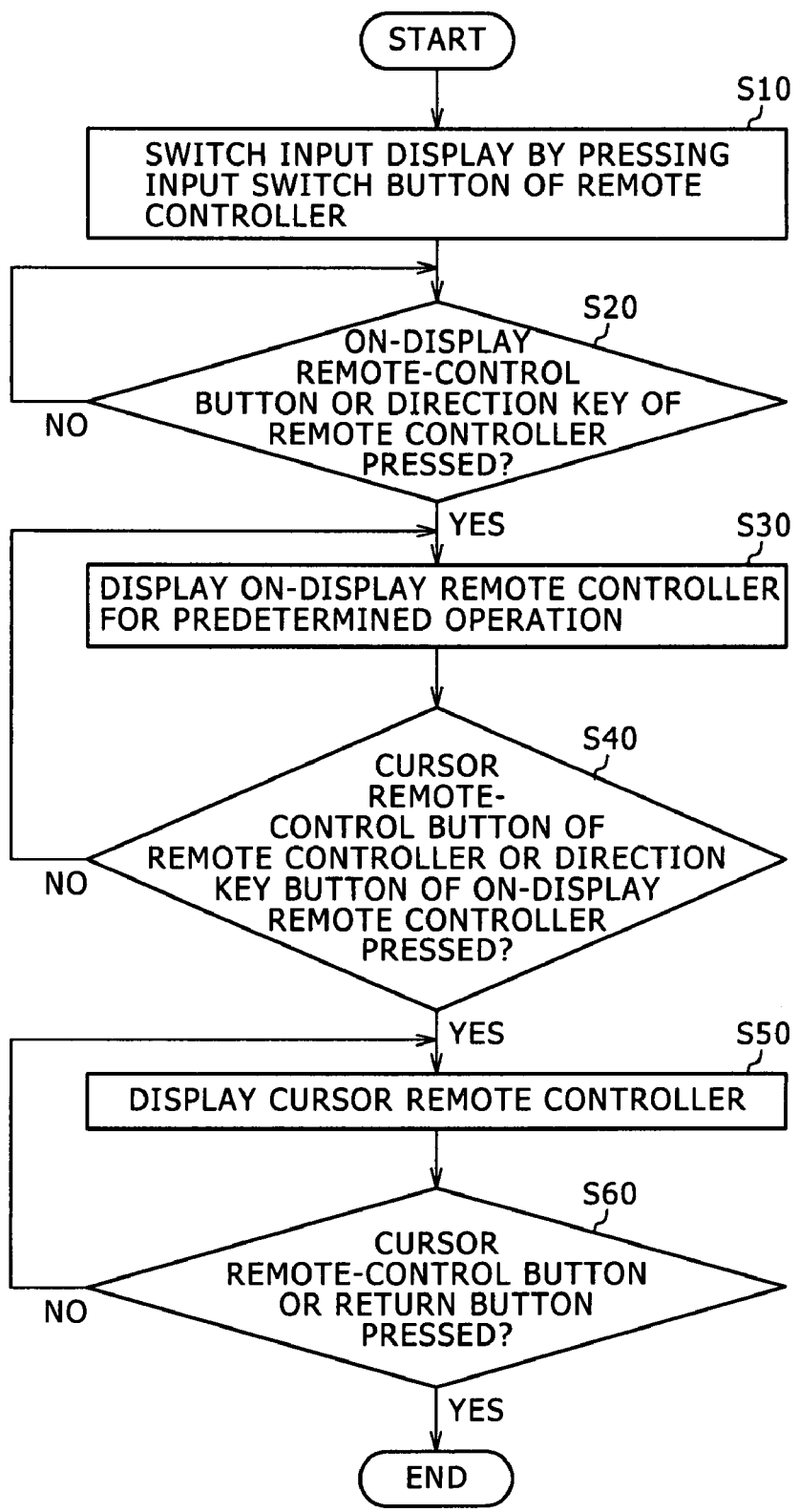
FIG. 5 is a flowchart showing an operation of the TV box.
Figure 6:
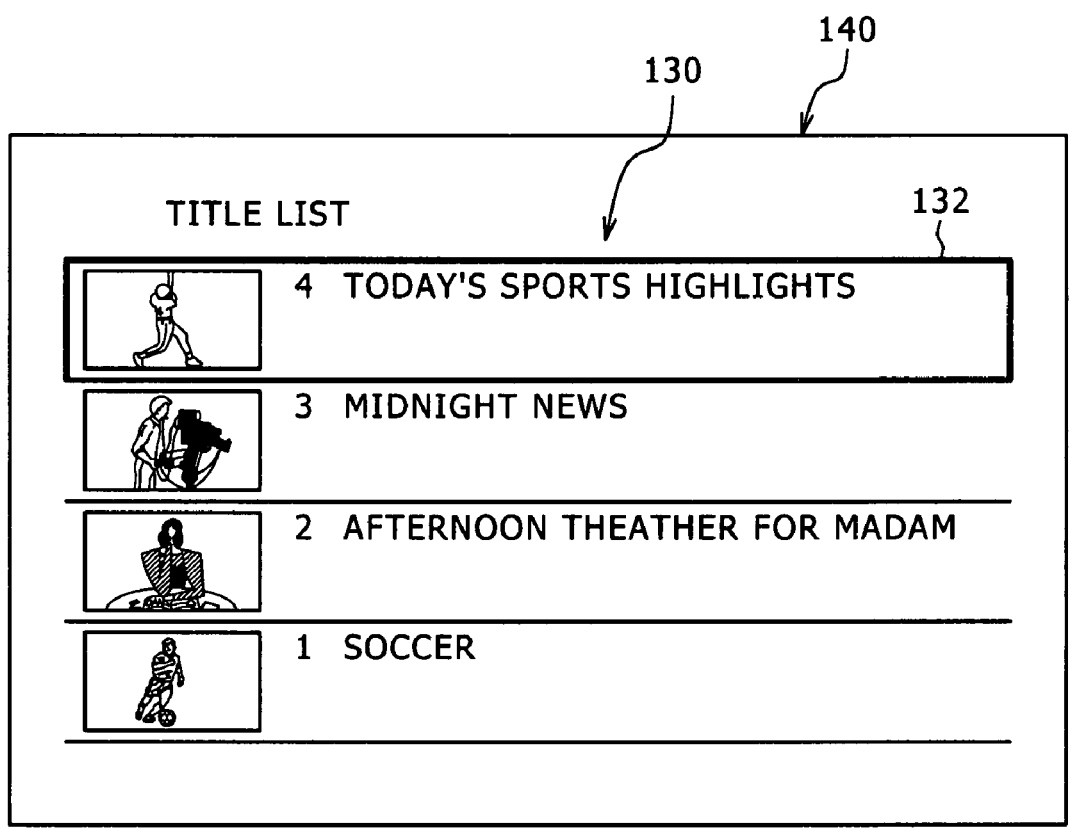
FIG. 6 is a view showing one display instance of a menu display on a liquid crystal panel screen.
Figure 7:
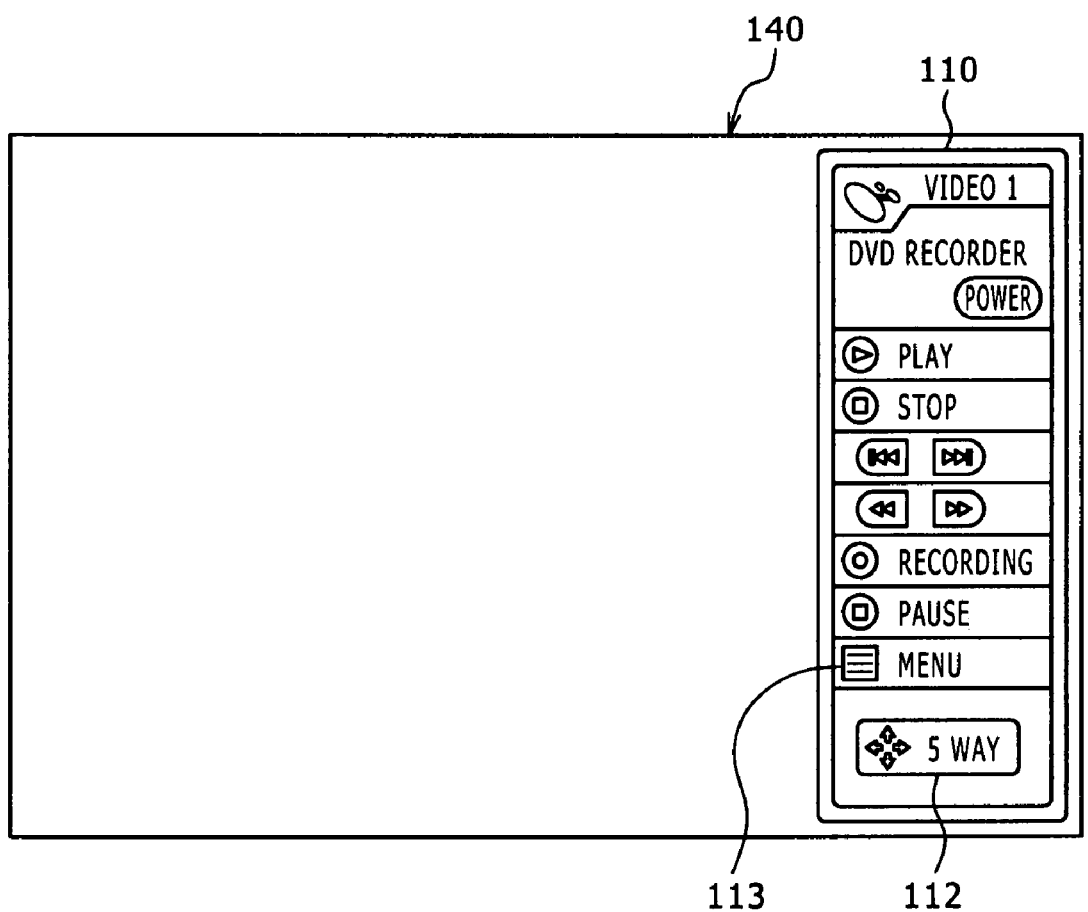
FIG. 7 is a view showing one instance where a remote control panel is displayed on a screen after selection of an external device.
Figure 8:
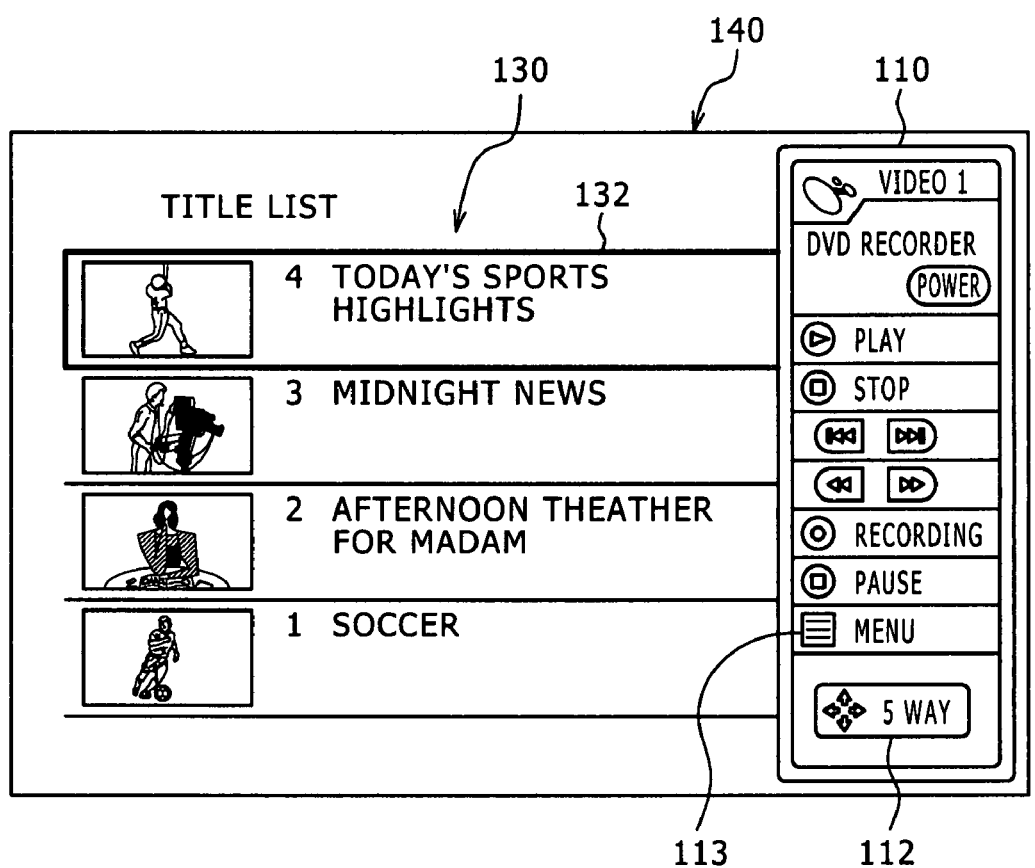
FIG. 8 is a view showing one instance where a menu screen appears after selection of a menu button on the remote control panel on a screen.
Figure 9:
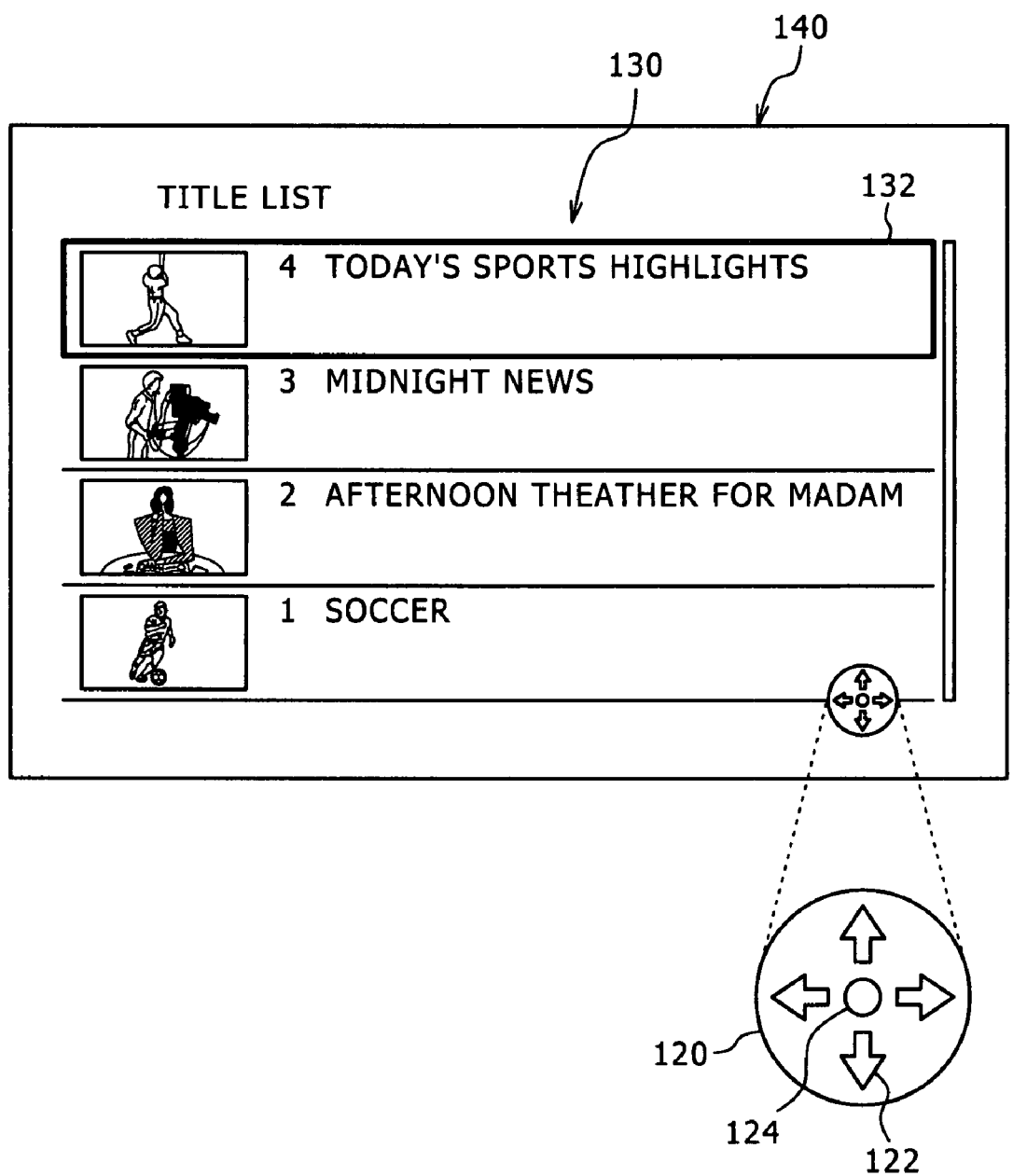
FIG. 9 is a view showing one display instance of a cursor remote controller on the menu screen.

One instance operation is described that the remote control panel 110 is displayed on the screen of the liquid crystal display apparatus 84 connected to the TV box 50, and the on-screen remote control panel 110 is switched to the cursor remote control key 120. FIG. 5 is a flowchart showing a switching operation of screen display. FIG. 6 is a view showing one instance of a menu screen 130 (or a title list) 130 of the external device 48 (a DVD recorder, for instance). FIG. 7 is a view showing one instance when the remote control panel 110 is displayed after the external device 48 (the DVD recorder, for instance) is selected. FIG. 8 is a view showing one instance when the menu screen 130 appears after a menu button of the remote control panel 110 is selected. FIG. 9 is a view showing one display instance of the cursor remote control key 120 on the menu screen 130.

As shown in FIG. 5, in Step S10, when a user presses the input switching button of the attached remote controller 52 in the TV box 50 to select the external device 48, a screen of the liquid crystal display apparatus 84 is switched to a display adapted to display the image signal transmitted from the external device 48 (or the DVD recorder, for instance) connected to the base station 10.

In Step S20, the TV box 50 judges whether or not the remote control panel button 154 or the direction button 158 of the attached remote controller 52 is pressed by a user. When the remote control panel button 154 or the like of the attached remote controller 52 is pressed, the processing is followed by Step S30. In this case, the remote controller signal is outputted from the attached remote controller 52 to the TV box 50. On the other hand, if none of the buttons of the attached remote controller 52 is pressed, the display goes into a standby state.

In the Step S30, the TV box 50 detects the outputted controller signal, followed by supplying, to the liquid crystal display apparatus 84, the remote control panel data corresponding to the remote controller signal. In the liquid crystal display apparatus 84, the display operation is performed based on the supplied remote control panel data to display the remote control panel 110 on the right of the screen 140, as shown in FIG. 7. The remote control panel 110 displayed on the screen 140 has buttons such as a play button, a stop button, a fast rewind button, a fast forward button, a recording button, a cursor remote-control switching button or a 5-way button and a menu button 113, and the like. It is noted that since the external device 48 of various makers or machine types is connected to the base station 10, the remote control panel 110 in which kinds and arrangement of buttons are registered in advance in accordance with makers or machine types connected to the base station 10 is displayed on the screen 140. At this time, a background screen appears as an image supplied from the external device 40 or blue back display. Next, the user carries out a predetermined operation by pressing the enter button 160, after selecting a desired item to be operated from the displayed remote control panel 110 by the direction button 158 of the attached remote controller 52.

At this time, pressing the direction button 158 of the attached remote controller 52 causes each operating button of the remote control panel 110 to be highlighted in sequence, thus it becomes apparent that the operating button is selected.

Further, if the menu button 113 of the remote control panel 110 is selected and entered at this step, the title list shown in FIG. 6, for instance, is displayed on the left side of the remote control panel 10 on the screen 140, as shown in FIG. 8.

In Step S40, the TV box 50 judges whether or not a user presses the cursor remote control button 156 of the attached remote controller 52 or the cursor remote-control switching button 112 of the remote control panel 110. When the result of judgment is that the button such as the cursor remote control button 156 is pressed, the processing is followed by Step S50, and the infrared type remote controller signal is outputted from the attached remote controller 52. On the other hand, if the result of judgment is that none of the buttons such as the cursor remote control button is pressed, the display goes into a state in which the menu screen 130 and the remote control panel 110 remain displayed (the Step S30) to perform the predetermined operation.

In the Step S50, the TV box 50 detects the outputted remote controller signal, followed by supplying, to the liquid crystal display apparatus 84, the cursor remote control data corresponding to the remote controller signal. In the liquid crystal display apparatus 84, the display operation is performed based on the supplied cursor remote control data to display the cursor remote control key 120 on the screen 140, as shown in FIG. 9. The cursor remote control key 120 is displayed in the form of a small-sized icon on the lower right portion of the screen 140, for instance, so as not to interfere with the television and DVD images and/or the menu screen displayed on the screen 140. Further, the cursor remote control key 120 has up, down, left and right direction buttons 122 and an enter button 124 placed in the center of these direction buttons.

Further by this step, the cursor of the title list may be directly moved or positioned by operating the direction button 158 and the enter button 160 of the attached remote controller 52.

In Step S60, the TV box 50 judges whether or not the cursor remote control button 156 or the return button 162 of the attached remote controller 52 is pressed by a user. When the result of judgment is that the button such as the cursor remote control button 156 of the attached remote controller 52 is pressed, the cursor remote control key 120 in the form of the icon displayed on the screen 140 is erased to bring the cursor operation on the menu screen 130 to end. At this time, the display goes into a state in which the remote control panel 110 remains displayed, and after a predetermined period of time has elapsed, the remote control panel 110 is set to disappear automatically. On the other hand, when the result of judgment is that the cursor remote control button 156 or the like of the attached remote controller 52 is not pressed, the processing is returned to the Step S50, and the cursor remote control key 120 is displayed on the screen 140.

Figure 10:
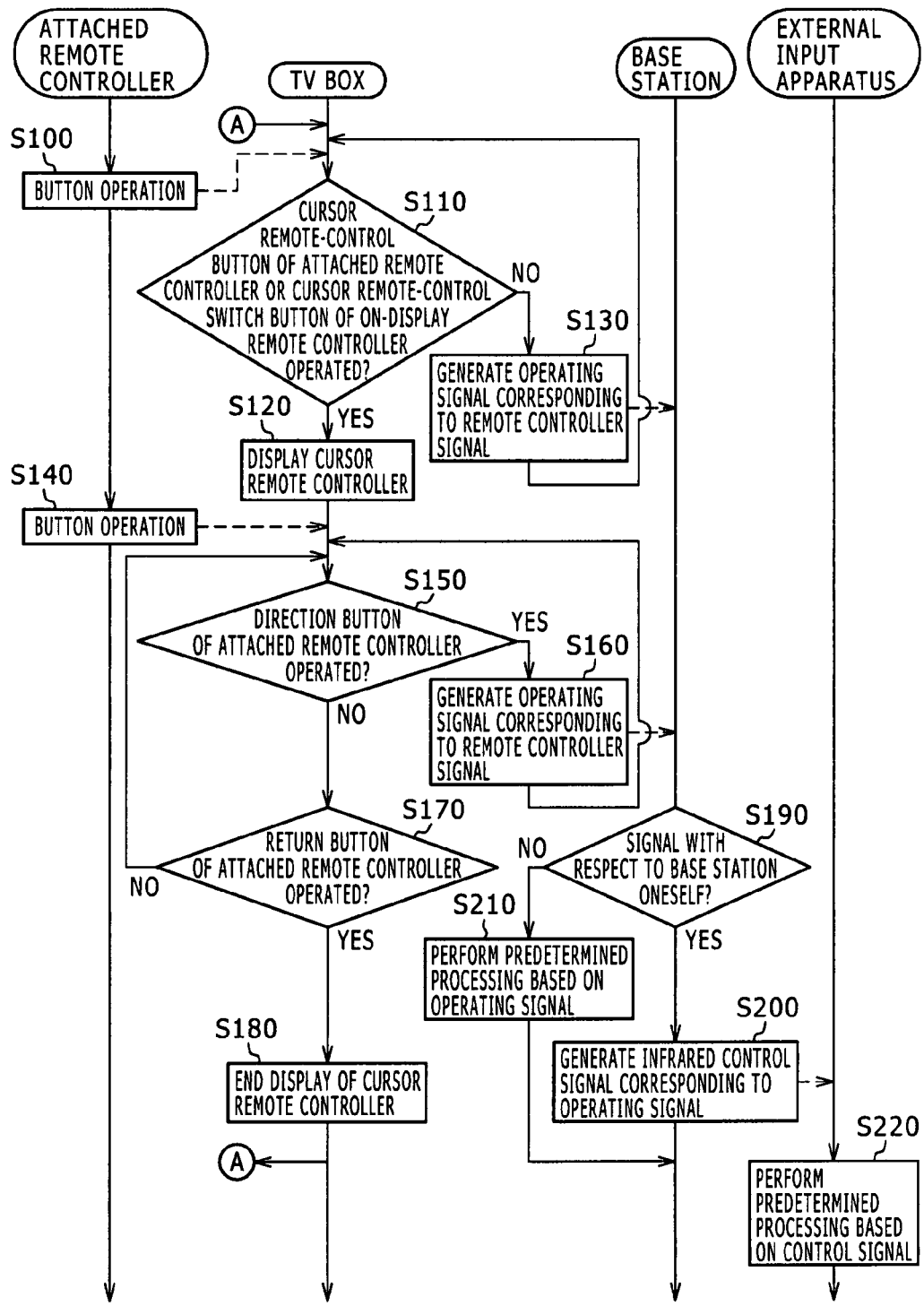
FIG. 10 is a flowchart showing a sequential operation of the information processing system according to one embodiment of the present invention.

An operation of the information processing system according to the embodiment of the present invention is now described. FIG. 10 is a flowchart showing one operation of the information processing system. FIGS. 11 to 14 are views respectively showing the cursor remote control key 120 and the menu display 130 when the cursor remote control key 120 is operated. It is noted that the following description is given on the assumption that the menu screen 130 of the DVD recorder specified as one instance of the external device 48 is displayed, together with the remote control panel 110 adapted to operate the menu screen 130, on the display 140 of the liquid crystal panel 86, for instance.

As shown in FIG. 10, in Step S100, after the button operation by the user is done, the attached remote controller 52 emits the remote controller signal in response to the operated button.

In Step S110, the TV box 50 judges, after detecting the remote controller signal emitted from the attached remote controller 52, whether or not the detected remote controller signal is of remote controller signals for displaying the cursor remote control key 120 on the screen 140 of the liquid crystal panel 86. In this processing, when the detected remote controller signal is a signal emitted by operating the cursor remote control button 156 of the attached remote controller 52, or a signal emitted by selectively operating the cursor remote-control switching button 112 of the remote control panel 110 displayed on the screen 140 of the liquid crystal panel 86, the detected remote controller signal is judged to be remote controller signals for displaying the cursor remote control key 120, and the processing is followed by Step S120. On the other hand, when the result of judgment is that the detected remote controller signal is of remote controller signals other than those for displaying the cursor remote control key 1120, the processing goes on to Step S130. The signals other than those for displaying the cursor remote control key 120 include those adapted to select the tuner 24 contained in the base station 10 or to operate the external device 48.

In the Step S120, the TV box 50 displays the cursor remote control key 120 on the screen 140 of the liquid crystal panel 86 (See FIG. 9).

In the Step S130, the TV box 50 performs the processing based on the remote controller signal other than those for displaying the cursor remote control key 120. For instance, when an operation of switching the buttons of the remote control panel 110 is performed, the selected button is displayed in the manner of being distinguishable from the others. Also, when an operation of bringing the function assigned to the selected button into practice is performed, remote control signal for allowing the base station 10 or the external device 48 connected to the base station 10 to perform the operation of the selected menu item, is generated, and transmits the generated remote control signal to the base station 10 with the wireless LAN 910 in between.

In Step S140, after the button operation by the user is done, the attached remote controller 52 also emits the remote controller signal corresponding to the operated button, like the Step S100. The following is described as related to a case where the down button of the attached remote controller 52 is operated by a user to select a desired title item for watching, for example, "soccer" from the title list of the menu screen 130 displayed on the screen 140 of the liquid crystal panel 86. The operation of the attached remote controller 52 causes the infrared type remote controller signal corresponding to "the down button" to be emitted from the attached remote controller 52.

Figure 11:
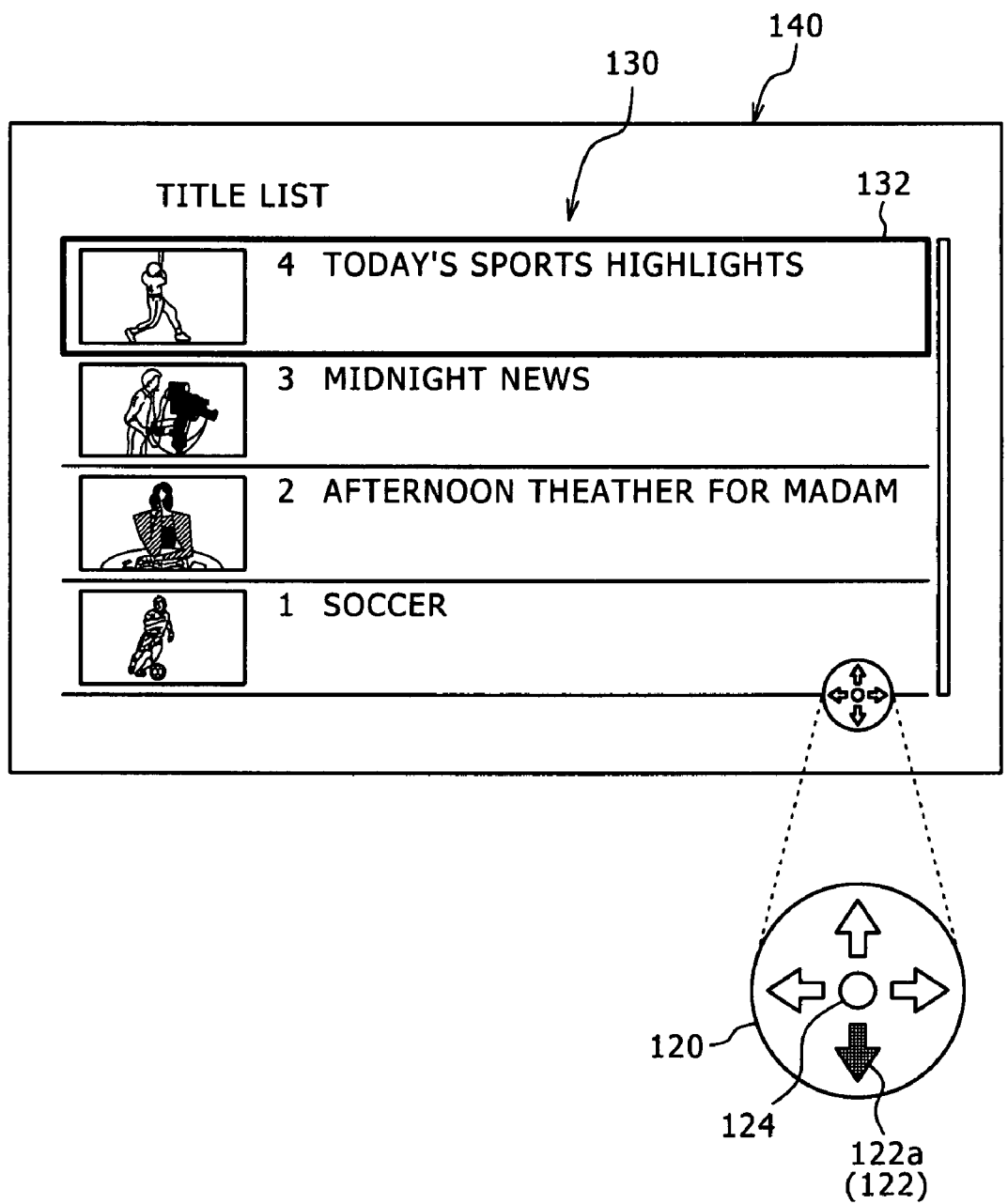
FIG. 11 is a view showing the cursor remote control key displayed on the liquid crystal panel (in a first stage)

In Step S150, the TV box 50 judges whether or not the detected remote controller signal is of signals corresponding to the operation of the button displayed as the cursor remote control key 120. In this processing, if the result of judgment is that the detected remote controller signal is of signals corresponding to the operation of the button displayed as the cursor remote control key 120, or for example, if remote controller signal is emitted when "the down button" displayed as the cursor remote control key 120 is operated, with respect to the attached remote controller 52, the processing is followed by Step S160. In this processing, a down button 122a of the cursor remote control key 120 is displayed differently from the other direction buttons such that the operated button is made distinguishable from the others by the cursor remote controller 120. For instance, the down button 122a of the cursor remote control key 120 is displayed in gray, while the other direction buttons are displayed in white, as shown in FIG. 11.

In Step S160, the TV box 50 generates the operating signal based on the remote controller signal, followed by transmitting the generated remote controller signal to the base station 10 with the wireless LAN 910 in between. For instance, with respect to the attached remote controller 52, when "the down button" is operated, the operating signal corresponding to the down button 158 is generated to be transmitted to the base station 10.

In Step S170, the TV box 50 judges whether or not the detected remote controller signal is the end of the remote control operation using the cursor remote control key 120. When the detected remote controller signal is a signal emitted by operation of the return button 162 of the attached remote controller 52, the processing is followed by Step S180. On the other hand, when the detected remote controller signal is a signal not corresponding to the operation of the return button 162, the processing is returned to the Step S150.

In the Step S180, the TV box 50 ends the display of the cursor remote control key 120, and the processing is returned to the Step S110. It is noted that when the display of the cursor remote control key 120 is ended, there may be given the restored menu display as back as to the state prior to the display of the cursor remote control key 120. Alternatively, it is also allowable to perform ending only the display of the cursor remote control key 120.

In Step S190, the base station 10 judges whether or not the operating signal transmitted from the TV box 50 in the Steps S130 and S160 is of signals with respect to the base station 10 for oneself. For example, when the operating signal is of signals with respect to the tuner 24 contained in the base station 10, or those related to the settings of the base station 10, for instance, the processing goes on to Step S210. Also, when the transmitted operating signal is of signals other than those with respect to the base station 10 for oneself, or those corresponding to the external device 48 connected to the base station 10, for instance, the processing is followed by Step S200. In this processing, operating the "down button" with respect to the title item for the external device 48 connected to the base station 10 as described the causes the processing to be followed by the Step S200.

In the Step S200, the base station 10 performs the processing for emitting the control signal (the remote controller signal) based on the operating signal.

In the Step S210, the base station 10 performs the processing corresponding to the operating signal. As described above, for example, selection of the broadcasting signal is performed by the tuner 24.

In Step S220, the external device 48 detects the control signal emitted at the base station 10, and performs various processing based on the remote controller signal.

Figure 12:
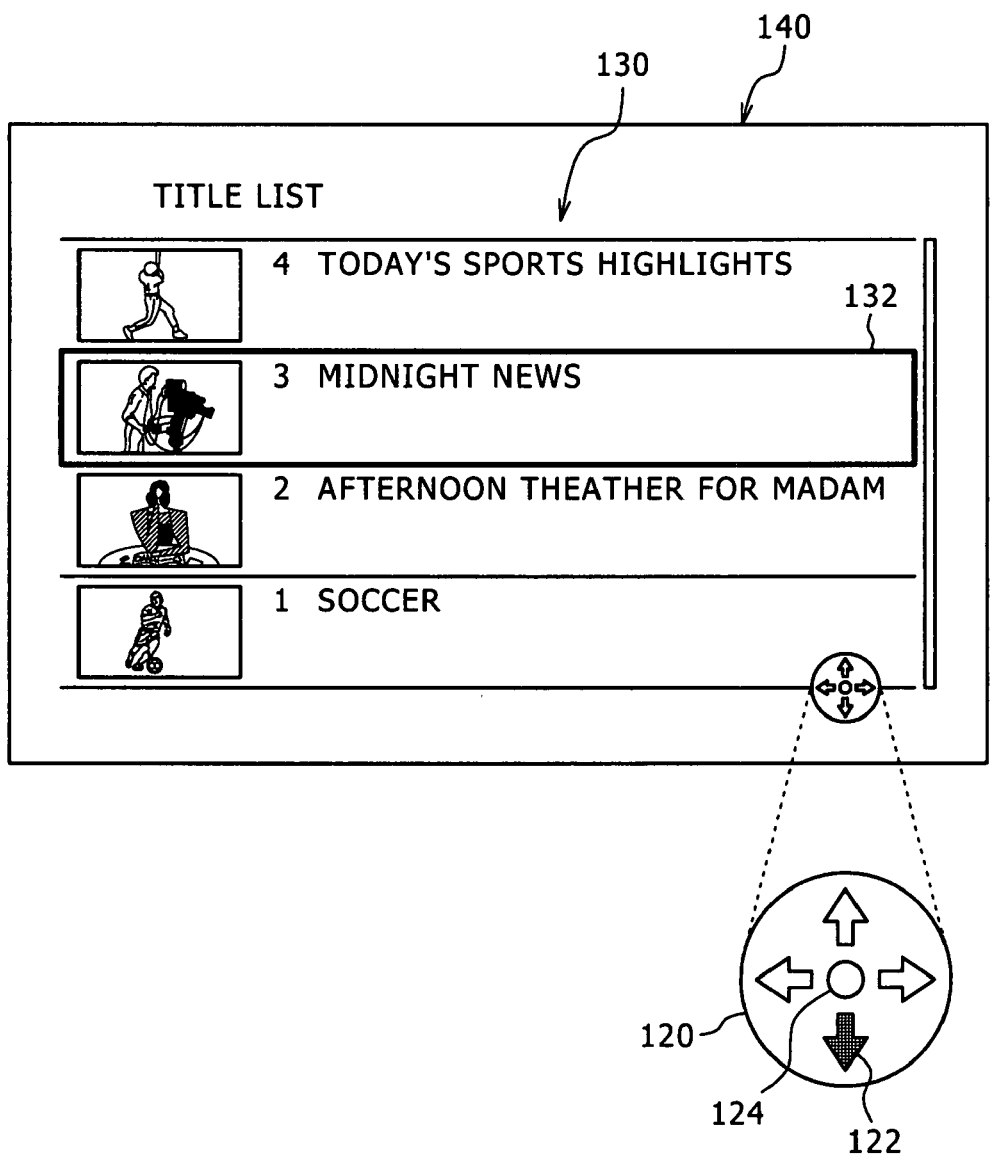
FIG. 12 is a view showing the cursor remote control key displayed on the liquid crystal panel (in a second stage)
Figure 13:
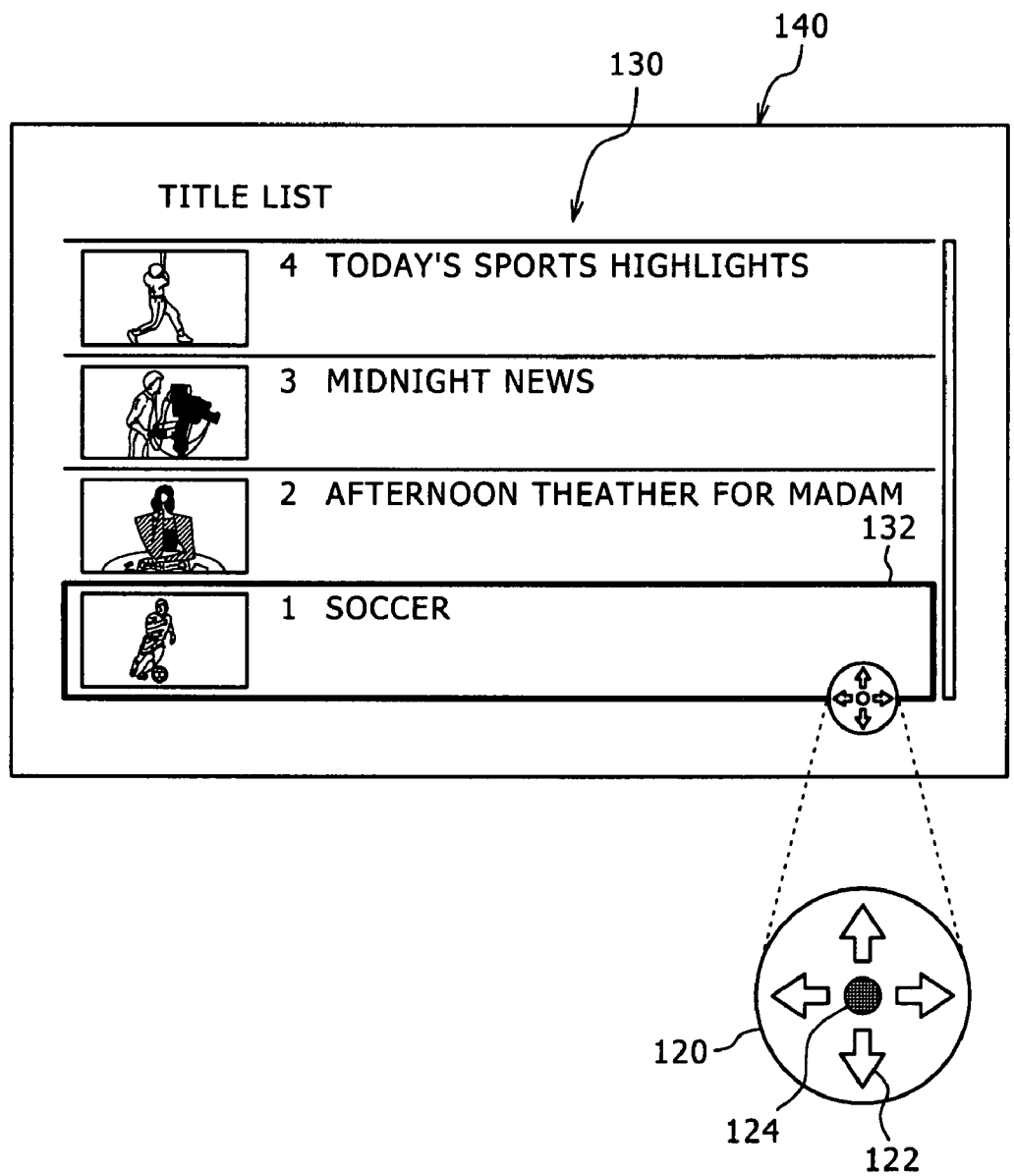
FIG. 13 is a view showing the cursor remote control key displayed on the liquid crystal display (in a third stage)
Figure 14:
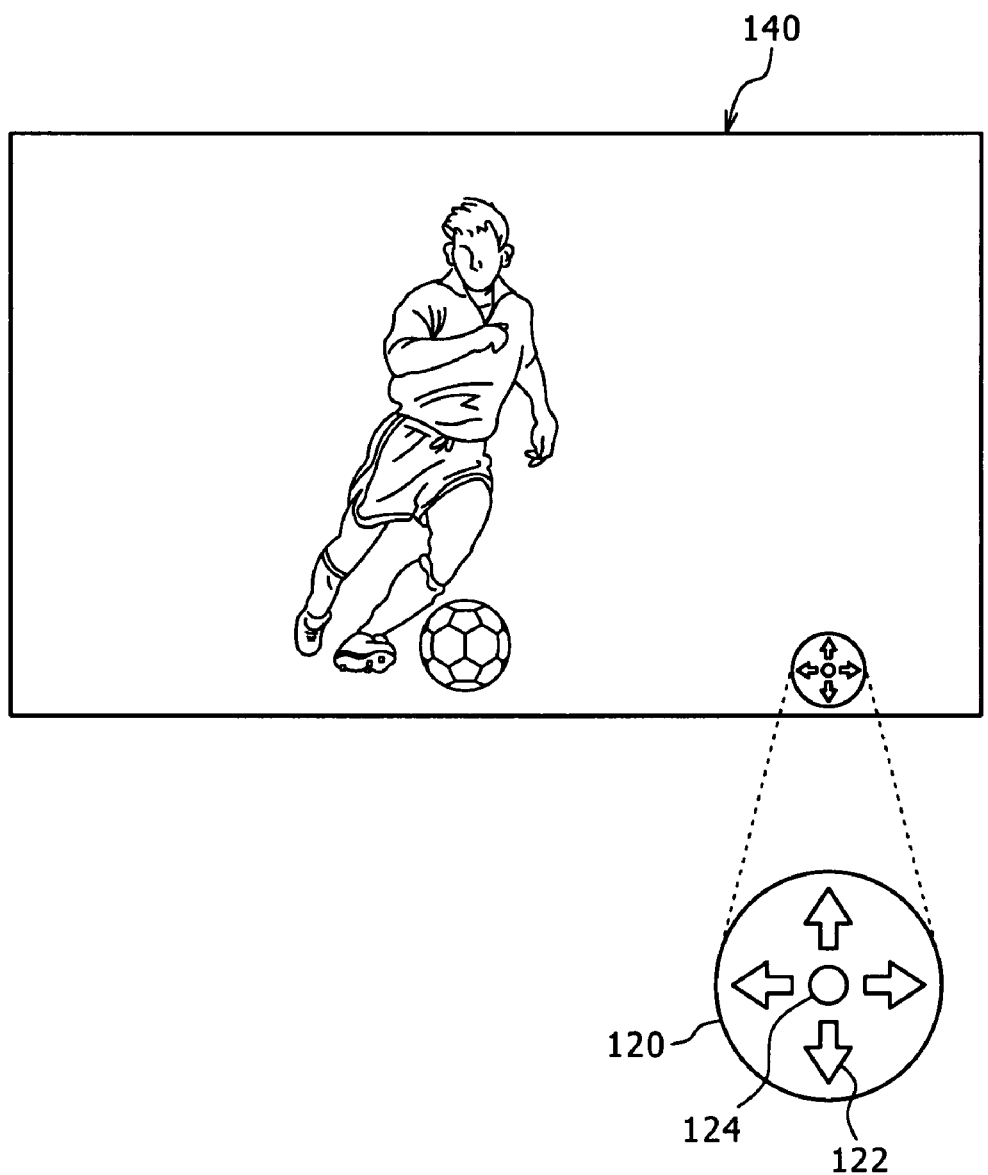
FIG. 14 is a view showing the cursor remote control key displayed on the liquid crystal display (in a fourth stage)
Figure 15:
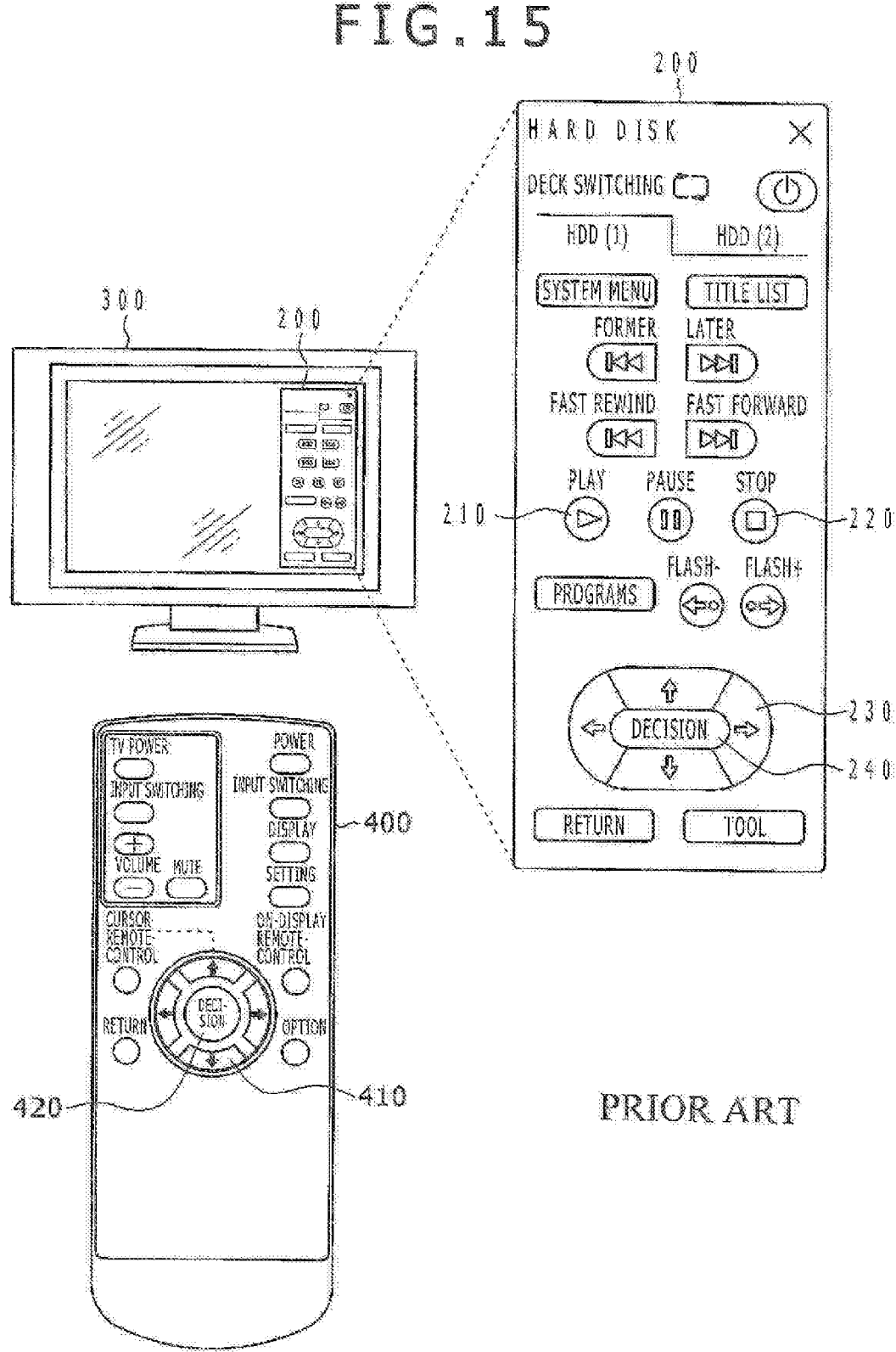
FIG. 15 is a view showing a liquid crystal panel screen on which a remote control panel in the related art is displayed.

When the button displayed as the cursor remote control key 120 is operated with the attached remote controller 52 by the above-mentioned processing, operating signal in response to the operated button is supplied from the TV box 50 to the base station 10, such that the processing corresponding to the button operation is performed on the base station 10 or the external device 48. Thus, pressing the corresponding enter button 160 of the attached remote controller 52 corresponding to the enter button 124 of the cursor remote control key 120 after the cursor 132 on the menu screen 130 of the liquid crystal panel 86 reaches "soccer" included in the title list as shown in FIGS. 12 and 13, for instance, causes AV data with respect to "soccer" included in the title list to be supplied from the external device 48 to the TV box 50 with the base station 10 in between, and thus an image of "soccer" is displayed on the screen 140 of the liquid crystal panel 86, as shown in FIG. 14.

In the embodiment of the present invention, pressing the predetermined direction button among the direction buttons 158 of the attached remote controller 52 by the user causes the direction button 122 in the same direction as that of the pressed direction button 158, among the buttons of the cursor remote control key 120 on the display of the liquid crystal panel to be luminously highlighted. Approximately at the same time the direction button 122 is highlighted, the cursor 132 on the menu screen 130 serving as the background screen of the cursor remote control key 120 is moved in the same direction as that indicated by the highlighted direction button 122 of the cursor remote control key 120. Specifically, with respect to the menu display, a title list display and a program list display related to the external device 48, displayed on the screen 140 of the liquid crystal panel 86 only operating the direction button 158 and/or the enter button 160 of the attached remote controller 52 corresponding to the cursor remote control key 120 enables the cursor 132 on the display such as the menu display 130 to be moved and positioned. Thus, the user may receive an impression that the display such as the menu display 130 seems to be operated directly with the attached remote controller 52 near at hand, and thus operability is improved.

While an embodiment of the present invention is described as related to the case of the two-way communications between the TV box 50 and the base station 10 with the wireless LAN 910 in between, it may be safely said that an embodiment of the present invention is also applicable to cases of two-way communications with the Internet 900 in between.

It is noted that while hardware may be adaptable to implement a series of processing described above, use of software is also acceptable. When making an attempt to implement the series of processing by the software, installing a program contained in the software into a computer integrated in its dedicated hardware makes it possible to perform the various functions described the above. Alternatively, with the program stored in a recording medium of a type such as magnetic disks (including flexible disks), optical disks (including CD-ROMs and DVDs), magneto-optical disks (including MDs) and semiconductor memories, it is also allowable to install the program from the recording medium of the type into the computer.

An embodiment of the present invention is applicable to cases where contents such as television images or recorded images viewed in a place such as a living room, are viewed at a television in a room other than a living room.

According to an embodiment of the present invention, a user may have an impression that the user directly operates a cursor on menu screen by the remote controller, and whereby operability may be improved.

It should be understood by those skilled in the art that various modifications, combinations, sub-combinations and alterations may occur depending on design requirements and other factors insofar as they are within the scope of the appended claims or the equivalents thereof.

The invention claimed is:

1. An information processing system comprising:
a first information processing apparatus and a second information processing apparatus coupled to each other through communications means,
wherein the first information processing apparatus includes
a transmitting/receiving unit effecting two-way communications with the second information processing apparatus, and
a control unit that transmits data corresponding to a received operating signal from the transmitting/receiving unit to the second information processing apparatus in response to an operating signal transmitted from the second information processing apparatus, and to perform control of the first information processing apparatus;
the second information processing apparatus includes:
a transmitting/receiving unit effecting two-way communications with the first information processing apparatus,
a display apparatus displaying an image based on the data transmitted from the first information processing apparatus, and
a control unit that displays, on a screen of the display apparatus, a first operating image for operating the first information processing apparatus and a second operating image for operating a menu screen related to the first information processing apparatus, in response to a remote controller signal supplied from a remote controller; and
wherein the control unit of the second information processing apparatus transmits an operating signal corresponding to an operating item from the transmitting/receiving unit to the first information processing apparatus, if with respect to the first operating image, an enter key on the remote controller is operated after an operation of a direction key on the remote controller and selection of a predetermined operating item included in the first operating image, and
an operating signal corresponding to an operated key from the transmitting/receiving unit to the first information processing apparatus, if with respect to the second operating image, the direction key or the enter key of the remote controller corresponding to a predetermined direction-indicating direction key or an enter key included in the second operating image is operated,
wherein the first operating image includes a selectable item corresponding to a plurality of keys on the remote controller respectively included in the second operating image, each of the keys included in the second operating image being other than keys displayed on the screen of the display apparatus when the first operating image is displayed on the screen of the display apparatus,
wherein the control unit of the second information processing apparatus displays by switching the first operating image displayed on the screen of the display apparatus to the second operating image when the remote controller is operated to supply a remote controller signal for displaying the plurality of keys on the remote controller corresponding to the selectable item in the first operating image while the first operating image is displayed on the screen of the display apparatus.

2. The information processing system according to claim 1, wherein the remote controller has a second operating image switching button for switching the first operating image to the second operating image; and pressing the second operating image switching button causes the first operating image displayed on the screen of the display apparatus to be switched to the second operating image.

3. The information processing system according to claim 1, wherein when direction the key indicating any direction or the enter key of the second operating image is selected, the second information processing apparatus displays, on the screen of the display apparatus by highlighting a direction key indicating a selected direction or the selected enter key.

4. An information processing apparatus coupled to an arbitrary information processing apparatus by communications means, comprising:
   a transmitting/receiving unit for effecting two-way communications with another information processing apparatus;
   an image processing unit adapted to allow a display apparatus to display an image based on data transmitted from the other information processing apparatus; and
   a control unit adapted to display, on a screen of the display apparatus by the image processing unit, a first operating image for operating the other information processing apparatus and a second operating image for operating a menu screen in relation to the other information processing apparatus displayed on the display apparatus in response to a remote controller signal supplied from a remote controller;
   wherein the control unit transmits an operating signal corresponding to a selected item from the transmitting/receiving unit to the other information processing apparatus, if with respect to the first operating image, an enter key on the remote controller is operated after an operation of a direction key on the remote controller and selection of a predetermined item included in the first operating image, and transmits an operating signal corresponding to the operated key from the transmitting/receiving unit to the other information processing apparatus, if with respect to the second operating image, the direction key or the enter key of the remote controller corresponding to a predetermined direction-indicating direction key or an enter key included in the second operating image is operated,
   wherein the first operating image includes a selectable item corresponding to a plurality of keys on the remote controller respectively included in the second operating image, each of the keys included in the second operating image being other than keys displayed on the screen of the display apparatus when the first operating image is displayed on the screen of the display apparatus,
   wherein the control unit displays by switching the first operating image displayed on the screen of the display apparatus to the second operating image when the remote controller is operated to supply a remote controller signal for displaying the plurality of keys on the remote controller corresponding to the selectable item in the first operating image while the first operating image is displayed on the screen of the display apparatus.

5. An information processing method performed with an arbitrary information processing apparatus coupled through communications means, comprising:
   a transmitting/receiving step of effecting two-way communications with another information processing apparatus;
   an image processing step of allowing a display apparatus to display an image based on data transmitted from the other information processing apparatus; and
   a control step of displaying, on a screen of the display apparatus, a first operating image for operating the other information processing apparatus and a second operating image for operating a menu screen relating to the other information processing apparatus displayed on the display apparatus in response to a remote controller signal supplied, from a remote controller;
   wherein the control step is adapted to transmit an operating signal corresponding to a selected item to the other information processing apparatus, if with respect to the first operating image, an enter key on the remote controller is operated after an operation of a direction key on the remote controller and selection of a predetermined item included in the first operating image, and transmits an operating signal corresponding to the operated key to the other information processing apparatus, if with respect to the second operating image, the direction key or the enter key of the remote controller corresponding to a predetermined direction-indicating direction key or an enter key included in the second operating image is operated,
   wherein the first operating image includes a selectable item corresponding to a plurality of keys on the remote controller respectively included in the second operating image, each of the keys included in the second operating image being other than keys displayed on the screen of the display apparatus when the first operating image is displayed on the screen of the display apparatus,
   wherein the control step is adapted to display by switching the first operating image displayed on the screen of the display apparatus to the second operating image when the remote controller is operated to supply a remote controller signal for displaying the plurality of keys on the remote controller corresponding to the selectable item in the first operating image while the first operating image is displayed on the screen of the display apparatus.

6. A non-transitory computer-readable recording medium on which a program of an information processing method performed with an arbitrary information processing apparatus coupled through communications means is recorded, the program being executable by a computer and including;
   a step of displaying, on a screen of a display apparatus, a first operating image for operating another information processing apparatus and a second operating image for operating a menu screen relating to the other information processing apparatus displayed on the display apparatus in response to a remote controller signal supplied from a remote controller;
   a step of transmitting an operating signal corresponding to a selected item from a transmitting/receiving unit to the other information processing apparatus, when with respect to the first operating image, an enter key included in the remote controller is operated after an operation of a direction key on the remote controller and selection of a predetermined item included in the first operating image; and
   a step of transmitting an operating signal corresponding to the operated key from the transmitting/receiving unit to the other information processing apparatus, when with respect to the second operating image, the direction key or the enter key of the remote controller corresponding to a predetermined direction-indicating direction key or an enter key included in the second operating image is operated, wherein the first operating image includes a selectable item corresponding to a plurality of keys on the remote controller respectively included in the second operating image, each of the keys included in the second operating image being other than keys displayed on the screen of the display apparatus when the first operating image is displayed on the screen of the display apparatus, wherein the step of displaying includes switching the first operating image displayed on the screen of the display apparatus to the second operating image when the remote controller is operated to supply a remote controller signal for displaying the plurality of keys on the remote controller corresponding to the selectable item in the first operating image while the first operating image is displayed on the screen of the display apparatus.

* * * * *